United States Patent Office 3,788,972
Patented Jan. 29, 1974

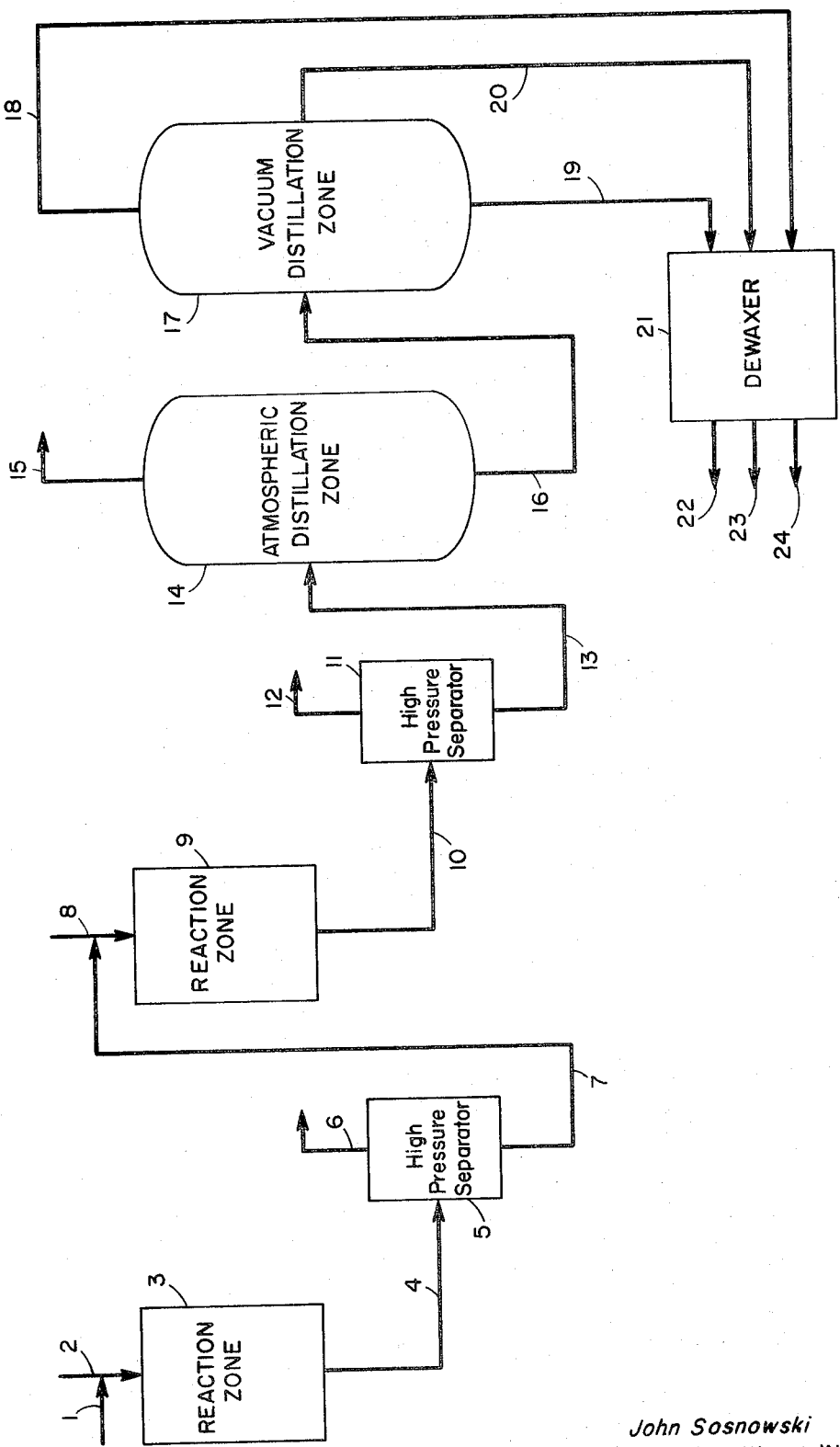

3,788,972
PROCESS FOR THE MANUFACTURE OF LUBRICATING OILS BY HYDROCRACKING
H. Clarke Henry and John B. Gilbert, Sarnia, Ontario, Canada, and John Sosnowski, Westfield, N.J., assignors to Esso Research and Engineering Company
Filed Nov. 22, 1971, Ser. No. 200,854
Int. Cl. C01b 33/28; C10g 37/02
U.S. Cl. 208—59                         18 Claims

ABSTRACT OF THE DISCLOSURE

Lubricating oils having UV stability, low color intensity and uniform viscosity index ($VI_E$) distribution are prepared from hydrocarbon feedstocks in a two-stage process in which the feedstock is first hydrogenated and mildly hydrocracked over a first hydrocracking catalyst, and then further hydrogenated and hydrocracked over a second hydrocracking catalyst mixture comprising (1) an amorphous base component, (2) a crystalline aluminosilicate component preferably comprising 10-30 wt. percent of the total catalyst and having a $SiO_2:Al_2O_3$ mole ratio of at least 2.5 and an alkali metal content of less than about 2.0 wt. percent (as alkali oxide) and (3) a transition metal hydrogenation component.

BACKGROUND OF THE INVENTION

Field of the invention

The present invention relates to a process for the preparation of lubricating oils. More particularly, the process relates to the preparation of lubricating oils having relatively uniform extended viscosity index ($VI_E$) distribution, low color intensity and UV stability. Still more particularly, the invention relates to a hydrogenation-hydrocracking process for the preparation of high quality lube oils.

Description of the prior art

In the past, feedstocks such as raw petroleum distillates and deasphalted oils have been upgraded to lubricating oil products by either solvent extraction and/or by hydrocracking the feedstock over a suitable catalyst. One catalyst type commonly employed in hydrocracking processes comprises a predominant proportion of an amorphous support and a minor proportion of at least one constituent exhibiting hydrogenation activity. The hydrogenation components were usually selected from oxides and sulfides of Group VI and/or VIII metals of the Periodic Table. The Periodic Table referred to herein is that described in "The Encyclopedia of Chemistry," Reinhold Publishing Corporation, 2nd Edition (1966), at page 793. The amorphous support used was typically diatomaceous earth or alumina. A second group of catalytic materials used consisted of crystalline aluminosilicates or zeolites, commonly referred to as molecular sieves. Such materials possess an ordered internal structure with pores of uniform size and with each zeolite type, such as X or Y, having its own characteristic pore size. These catalysts have been used alone or admixed with small amounts of amorphous materials such as clay.

The above catalyst types have been used in hydrocracking processes for the production of lube oils exhibiting improved $VI_E$ and color characteristics. One of the major disadvantages of prior art hydrocracking processes as exemplified in U.S. Pats. 2,915,452 and 3,494,854 is the need for high hydrogenation temperatures to produce lubricating oils with the desired characteristics. High temperature processing favors dehydrogenation and coke formation thus necessitating the use of high pressures in order to reduce the coking rate.

Ultraviolet stability of the lubricating oil products produced from the above-mentioned hydrocracking processes is usually inadequate as evidenced by the formation of a preciptate or sludge in the oil after a relatively short period of exposure to ultraviolet light (UV), e.g. daylight. Such a precipitate is undesirable not only because it may prove detrimental to the lubrication function that the oil is designed to perform, but also because it reduces the esthetic value of what would otherwise be a clear, premium-quality oil. Accordingly, in the past, a finishing step, such as extractio, was usually required to provide lubricating oil products that were stable to ultraviolet light, i.e. relatively nondegradable when exposed to daylight. An additional disadvantage of traditional hydrocracking precesses is the preparation of lube oil products with non-uniform $VI_E$ distribution. Specification requirements necessitate high extended viscosity index ($VI_E$) values coupled with fairly uniform $VI_E$ distribution throughout the lube basestock slate, i.e. low and high viscosity basestocks. This requirement is due, in part, to the fact that the basestocks are usually blended to obtain lube oils having desired characteristics. In conventional lube hydrocracking it is necessary to recycle or retreat the lower viscosity products in order to improve their $VI_E$ to the same desired level as the higher viscosity lube fractions. This has proven to be costly and time consuming.

It has now been found that the above-mentioned problemrs can be overcome and that lubricating oil products with relatively uniform $VI_E$ distribution, UV stability as characterized by large $t_s$ values, and low color intensity can be obtained by the process of this invention. The $t_s$ value, as used herein, refers to the time (measured in days) required for a precipitate or sludge to appear in a lube oil upon exposure of same to air and UV light such as daylight.

SUMMARY OF THE INVENTION

In accordance with the invention a two-stage hydrocracking process is employed to produce a high quality lubricating oil. More particularly, the present invention relates to a two-stage hydrocracking process for the production of high quality lubricating oils having UV stability, as characterized by large $t_s$ values, relatively uniform $VI_E$ distribution, low color intensity and reduced aromatic and polar compound content from hydrocarbon feedstocks that contain aromatic and organic polar compounds.

The first stage of the process comprises contacting a hydrocarbon feedstock, preferably a heavy petroleum oil feedstock, the predominant portion of which exhibits an initial boiling point at atmospheric pressure in excess of about 340° C., with hydrogen at hydrocracking conditions in the presence of a hydrocracking catalyst. The catalyst comprises (1) a mixture of a major amount of an amorphous base component and a minor amount of a hydrogenation component or (2) a mixture of a major amount of an amorphous base component and minor amounts of a crystalline aluminosilicate component, comprising less than about 9 wt. percent, preferably less than about 5 wt. percent of the total catalyst, and a hydrogenation component. At least a portion of the effluent from the first hydrocracking stage is contacted at hydrocracking conditions with hydrogen in the presence of a second catalyst comprising about 10–70 wt. percent, preferably 10–60 wt. percent of a crystalline aluminosilicate component in combination with an amorphous base component and a hydrogenation component.

The first-stage treatment of the feedstock yields only a moderate improvement with regard to color intensity. In addition, the lubricating oil components from the treated feed show poor stability to oxygen when exposed to daylight due to the presence of certain unstable, partly hydrogenated aromatics, such as the phenanthrene-type systems.

Some destructive hydrogenation of non-hydrocarbons, e.g. sulfur and nitrogen-containing compounds, also occurs in the first stage; however, conversion of heavy hydrocarbons in the feed to lower molecular weight materials boiling below about 371° C. is desirably held below about 30% by weight of total feedstock to the first stage, preferably below about 20 weight percent, most preferably below about 15 wt. percent. Moreover, fairly selective conversion of at least a portion of the high boiling lube oil components of the feed, i.e. hydrocarbons boiling above about 566° C., to lower boiling lube oil components occurs in the first stage. This results in a preferential upgrading of the $VI_E$ of the high boiling lube oil components.

It is noted that the extended viscosity index ($VI_E$) of an oil as determined by ASTM D2270-64 expresses the relationship between the viscosity and temperature of the oil. A high $VI_E$ indicates a general insensitivity of the oil viscosity to temperature. Since successful engine lubrication and, therefore, good engine performance depends upon maintaining an oil film of a sufficient viscosity at any temperature to prevent metal-to-metal contact of moving surfaces, it is apparent that a high $VI_E$ is desirable throughout the lube basestock boiling range.

The operative and preferred hydrocracking conditions in the first stage of the subject process are shown below in Table I:

TABLE I.—OPERATIVE AND PREFERRED OPERATION RANGES FIRST STAGE

| | Operative | Preferred |
|---|---|---|
| Temperature (° C.) | 260–538 | 371–427 |
| Pressure (p.s.i.g.) (H₂ partial pressure) | 600–10,000 | 1,000–2,500 |
| Space velocity of fresh feed (v./v./hr.) | 0.1–10.0 | 0.3–1.5 |
| Treat gas rate of hydrogen (s.c.f./b.) | 1,000–10,000 | 3,000–6,000 |
| Molar ratio of hydrogen to total fresh feed | 1–25 | 8–12 |

The effluent from the first stage will generally contain from about 5 to 20 wt. percent or aromatic and organic polar compounds based on total effluent and, preferably, less than 15 wt. percent. However, amounts up to about 25 wt. percent can be tolerated and will not affect, to any great degree, second stage conversion efficiency.

The aromatics referred to above include those normally found in hydrocarbon feedstocks such as multiple ring systems with molecular weights of 300 and greater and the like. Additionally, the organic polar compounds referred to above include, for example, oxygen, sulfur and nitrogen-containing aromatic and/or aliphatic compounds.

Generally the color intensity levels of total first stage effluent may range from about 1 to 8 (ASTM Standards, 17, p. 567, January 1967), preferably less than 4 ASTM. Additionally, the $VI_E$ of the total lube components of the first stage effluent may range from 70 to 140 with a preferred range of 80 to 95.

The second stage of the process comprises contacting at least a portion of the first stage effluent with a catalyst comprising a mixture of (1) an amorphous base component, (2) 10–70 wt. percent of a crystalline aluminosilicate component based on the total catalyst and (3) a hydrogenation component.

Gas-liquid separation means may be provided, if desired, between stages so that by-product ammonia, hydrogen sulfide and light hydrocarbons can be removed from the first stage effluent before it is contacted with the second stage catalyst. This is generally referred to as contacting in a "sweet" environment. However, the second stage can also operate efficiently in the presence of ammonia and hydrogen sulfide, i.e. contacting in a "sour" environment, by using more severe reaction conditions vis-à-vis the first stage operation.

Second stage treatment leads to conversion of a major portion of the aromatic and polar compounds contained in the first stage effluent to yield product having less than about 10 wt. percent aromatics and organic polar compounds, preferably less than about 5 wt. percent, based on total product. This results in the formation of almost colorless lube oil products, i.e. 0–2.5 (ASTM), preferably 0–0.5 (ASTM), and, in addition, UV stable lube oils with $t_s$ values ranging from 5 to 45 days or more, oils with $t_s$ values ranging from 5 to 45 days or more, and preferably greater than about 7 days.

Additionally, fairly selective conversion of the lower boiling lube oil feedstock components boiling between about 372–565° C., occurs in the second stage operation and results in an increase of the $VI_E$ of these components thereby producing substantially uniform $VI_E$ distribution, between about 70 and 140, preferably between 90 and 100 of the second stage product. By way of definition, substantially uniform $VI_E$ distribution means that there is less than about a 30% difference between the lowest and highest $VI_E$ values in the lube products, preferably less than about 15% and most preferably less than about 10%. Conversion of feed hydrocarbons in the second stage to lower molecular weight hydrocarbons remains below about 30 wt. percent, preferably below about 20 wt. percent by weight of total second stage feed.

Because of the high activity of the catalyst, very low processing severity, i.e. pressures and temperatures, is required in the second stage. These reduced operational requirements result in increased catalyst life vis-à-vis catalyysts used in the presently practiced operations. The operative and preferred second stage hydrocracking conditions are shown below in Table II:

TABLE II.—OPERATIVE AND PREFERRED OPERATION CONDITIONS SECOND STAGE

| | Operative | Preferred |
|---|---|---|
| Temperature (° C.) | 149–538 | 260–316 |
| H₂ partial pressure (p.s.i.g.) | 600–10,000 | 1,000–2,500 |
| Space velocities of feedstock (v./v./hr.) | 0.1–10.0 | 0.3–1.5 |
| Treat gas rate of hydrogen (s.c.f./b.) | 1,000–10,000 | 3,000–6,000 |

Second stage catalyst activity may diminsh after 60 or more days of continual use. However, the catalyst may be regenerated by conventional techniques involving, for example, controlled combustion to remove the inactivating deposits from the catalyst surface. Additionally, conventional reactivation and/or regeneration techniques may be applied to the first-stage catalyst.

Feedstocks that are suitable for use in the subject process include hydrocarbons, mixtures of hydrocarbons, and, particularly, hydrocarbon fractions, the predominant portions of which exhibit initial boiling points above about 340° C. Unless otherwise indicated, boiling points are taken at atmospheric pressure. Non-limiting examples of useful process feedstocks include crude oil vacuum distillates from paraffinic or naphthenic crudes, i.e. waxy crudes, deasphalted residual oils, the heaviest fractions of catalytic cracking cycle oils, coker distillates and/or thermally cracked oils, heavy vacuum gas oils and the like. These fractions may be derived from petroleum crude oils, shale oils, tar sand oils, coal hydrogenation products and the like. Preferred feedstocks include deasphalted petroleum oils that exhibit initial boiling points in the range of from about 500–565° C. and a Conradson Carbon Residue number less than about 3 and heavy gas oils that boil predominantly between about 340–565° C. and exhibit viscosities ranging from about 35–200, preferably 40–100 SUS at 210° F.

It is desirable that the feedstocks to the subject process be substantially free of asphaltenes, i.e. desirably less than about 1 wt. percent based on total feedstock to the process, since asphaltenes may poison the catalyst systems of the subject process. Although not critical to the efficiency of the process, the feedstock to the first stage will generally have $VI_E$ values ranging from about 20 to 80, preferably between about 40 to 70.

The process of this invention may be carried out in any equipment suitable for catalytic, high-pressure operation. The process may be batch or continuous. However, it is preferable to operate in a continuous mode. The process may be operated using a fixed bed of catalyst or a moving bed of catalyst wherein the hydrocarbon flow may be countercurrent or concurrent to the catalyst flow. Additionally, a fluid type operation may be used wherein the catalyst is suspended in the feedstock. Vapor phase, liquid phase, slurry phase or mixed phase contacting may be used. The first and second stages of the process may be combined into one reaction unit or alternatively may constitute separate units.

Contact time of the catalyst and feed in the first and second stages is subject to wide variation, being dependent in part upon the temperature and space velocities employed. In general, contact times in the first stage may range, for example, from 15 to 500 minutes and preferably from 60 to 120 minutes. Contact times in the second stage may range from 15 to 500 minutes and preferably from 60 to 120 minutes.

The liquid product from the second stage of the process may be used without further processing, or, preferably, if lower pour point products are desired, may be further processed such as by distillation and dewaxing operations. The lube oil products can be sold directly as basestocks or blended with additives to make formulated oils.

It is noted that the catalyst sequence is quite important in the application of this process. Thus, it is generally preferred that the fresh feedstock contact the first stage amorphous base catalyst prior to contact with the second stage crystalline/amorphous base catalyst composite.

A detailed description of the catalyst employed in the subject process is set forth below.

FIRST STAGE CATALYST

The first stage catalyst may be any conventional hydrocracking catalyst such as, for example, that described in U.S. Pats. 3,535,230 and 3,287,252, the disclosures of which are herein incorporated by reference. The catalyst comprises a mixture of a major amount of an amorphous component and a minor amount of a hydrogenation component preferably comprising one or more transitional metals selected from Groups VI-B and/or VIII of the Periodic Table and the oxides and sulfides thereof.

Representative of these metals are molybdenum, chromium, tungsten, nickel, cobalt, palladium, iron, rhodium, and the like, as well as combinations of these metals and/or their oxides and/or sulfides. Preferred metals are nickel, molybdenum and mixtures thereof. One or more of the metals, metal oxides or sulfides, alone or in combination, may be added to the support in minor proportions ranging from 1 to 25 wt. percent based on the total catalyst.

The amorphous component, i.e. support, can be one or more of a large number of non-crystalline materials having high porosity. The porous material is preferably inorganic but can be organic in nature if desired. Representative porous materials that can be employed include metals and metal alloys; sintered glass; firebrick; diatomaceous earth; inorganic refractory oxides; organic resins, such as polyesters, phenolics and the like; metal phosphates such as boron phosphate, calcium phosphate and zirconium phosphate; metal sulfides such as iron sulfide and nickel sulfide; inorganic oxide gels and the like. Preferred inorganic oxide support materials include one or more oxides of metals selected from Groups II-A, III-A and IV of the Periodic Table. Non-limiting examples of such oxides include aluminum oxide, titania, zirconia, magnesium oxide, silicon oxide, titanium oxide, silica-stabilized alumina and the like.

Preferably, the starting catalyst composition comprises a silica/alumina support containing molybdenum trioxide and nickel oxide hydrogenation components. The silica:alumina weight ratio in the amorphous support can range from 20:1 to 1:20 and preferably from 1:4 to 1:6. The molybdenum trioxide:nickel oxide weight ratio in the amorphous support can range from about 1:25 to 25:1 and preferably from 2:1 to 4:1. Finally, the weight ratio of the support to the hydrogenation component can range from about 20:1 to 1:20 and preferably from 4:1 to 6:1. A particularly preferred starting catalyst composition comprises:

|  | Wt. percent |
|---|---|
| NiO | 4.5 |
| $MoO_3$ | 13.0 |
| $SiO_2$ | 14.0 |
| $Al_2O_3$ | 68.4 |

The catalyst is preferably pre-sulfided by conventional methods such as by treatment with hydrogen sulfide or carbon disulfide prior to use. The precise chemical identity of the hydrogenation constituents present on the support during the course of the hydrocracking operation is not known. However, the hydrogenation components probably exist in a mixed elemental metal/metal oxide/metal sulfide form.

Additionally, low sieve-content catalysts consisting of a mixture of a major amount of an amorphous component and minor amounts of (1) a crystalline aluminosilicate component comprising less than about 9 wt. percent, preferably less than about 5 wt. percent of the total catalyst and (2) a hydrogenation component, can be used as first stage catalysts. The catalyst may also contain a small amount of $P_2O_5$, which acts to stabilize the catalyst against decomposition. The amorphous component (support) is similar to that described above. The hydrogenation component is preferably a transitional metal selected from Groups VI-B and VIII of the Periodic Table and/or the oxides and/or sulfides thereof. Useful catalyst metals include chromium, molybdenum, tungsten, platinum, palladium, cobalt, nickel, etc. One such catalyst comprises 95 wt. percent based on total catalyst of $NiO/MoO_3$ on a $SiO_2/Al_2O_3$ base (stabilized with $P_2O_5$) and 5 wt. percent based on total catalyst of nickel-exchanged faujasite. In general, the aluminosilicate can be a material of the type, more fully described hereafter, that is employed in the second stage catalyst.

The catalysts may be prepared by any of the general methods described in the art such as by cogelation of all the components, by impregnation of the support with salts of the desired hydrogenating components, by deposition, by mechanical admixture and the like.

SECOND STAGE CATALYST

The catalyst used in the second stage of the process comprises a mixture of (1) an amorphous component, (2) 10 to 70 wt. percent (based on total catalyst) of a crystalline aluminosilicate component and (3) a hydrogenation component. Catalysts of this type are exemplified and described more completely in U.S. Pats. 3,547,807, 3,304,254 and 3.547,808, the disclosures of which are incorporated herein by reference.

Preferably, the catalyst comprises a mixture of (1) a major component comprising an amorphous support upon which is deposited one or more transitional metal hydrogenation components, preferably selected from Groups VI–B and VIII metals of the Periodic Table and/or the oxides and/or sulfides thereof and (2) a minor component comprising a crystalline aluminosilicate zeolite having a silica:alumina mole ratio greater than about 2.5 and an alkali metal content of less than 2.0 wt. percent (as alkali metal oxide) based on the final aluminosilicate composition, and containing deposited thereon or exchanged therewith one or more transitional metal hydrogenation components preferably selected from Group VI–B and VIII metals of the Periodic Table and/or the oxides and/or sulfides thereof.

Amorphous component of second stage catalyst

The amorphous component (support) of the second stage catalyst is similar to that used in the first stage catalyst and can be one or more of a large number of non-crystalline materials having high porosity. The porous support is desirably inorganic; however, it may be an organic composition. Representative porous support materials include diatomaceous earth; sintered glass; firebrick; organic resins; alumina; silica-alumina; zirconia; titania; magnesia metal halides; sulfates; phosphates; silicates; and the like. Preferably, alumina or silica-stabilized alumina (desirably 1–5 wt. percent silica based on total support) is employed.

Suitable hydrogenation components that can be added to the porous support are the transitional metals and/or the oxides and/or sulfides thereof. The metals are preferably selected from Groups VI–B and VIII of the Periodic Table and are exemplified by chromium, molybdenum, tungsten, cobalt, nickel, palladium, iron, rhodium, and the like. The metals, metal oxides or sulfides may be added alone or in combination to the support. The preferred hydrogenation components are nickel, tungsten and molybdenum metals and the oxides and/or sulfides thereof. In use the hydrogenation components probably exist in a mixed metal/metal oxide or metal/metal oxide/metal sulfide form. The hydrogenation components are added to the support in minor proportions ranging from about 1 to 25% by weight based on the total amorphous component of the second stage catalyst. The hydrogenation components that are deposited on the porous support can be the same as or different from the hydrogenation components used in the crystalline aluminosilicate component of the second stage catalyst.

The amorphous component of the second stage catalyst can be prepared in any suitable manner. Thus, for example, if silica-alumina is employed, the silica and alumina may be mechanically admixed or, alternatively, chemically composited with the metal oxides such as by cogelation. Either the silica or alumina may, prior to admixture with the other, have deposited thereon one or more of the metal oxides. Alternatively, the silica and alumina may first be admixed and then impregnated with the metal oxides.

A preferred amorphous component of the second stage catalyst comprises alumina containing nickel oxide and tungsten oxide or molybdenum oxide. The weight ratio of nickel oxide to tungsten oxide or molybdenum oxide can range from about 1:25 to 25:1 and preferably from 1:4 to 1:6. Finally, the weight ratio of the support to total metal oxide can range from about 20:1 to 1:20 and preferably from 4:1 to 8:1.

Crystalline component of second stage catalyst

The crystalline aluminosilicate (sieve component) employed in the preparation of the crystalline component of the second stage catalyst is similar to that used in the low sieve-content catalysts employed in the first stage and comprises one or more natural or synthetic zeolites. Representative examples of particularly preferred zeolites are zeolite X, zeolite Y, zeolite L, faujasite and mordenite. Synthetic zeolites have been generally described in U.S. Pats. 2,882,244, 3,130,007 and 3,216,789, the disclosures of which are incorporated herein by reference.

The silica:alumina mole ratio of useful aluminosilicates is greater than 2.5 and preferably range from about 2.5 to 10. Most preferably this ratio ranges between about 3 and 6. These material are essentially the dehydrated forms of crystalline hydrous siliceous zeolites containing varying quantities of alkali metal and aluminum with or without other metals. The alkali metal atoms, silicon, aluminum and oxygen in the zeolites are arranged in the form of an aluminosilicate salt in a definite and consistent crystalline structure. The structure contains a large number of small cavities, interconnected by a number of still smaller holes or channels. These cavities and channels are uniform in size. The pore diameter size of the crystalline aluminosilicate can range from 5 to 15 A. and preferably from 5 to 10 A.

The aluminosilicate component may comprise a sieve of one specific pore diameter size or, alternatively, mixtures of sieves of varying pore diameter size. Thus, for example, mixtures of 5 A. and 13 A. sieves may be employed as the aluminosilicate component. Synthetic zeolites such as type-Y faujasites are preferred and are prepared by well-known methods such as those described in U.S. 3,130,007.

The aluminosilicate can be in the hydrogen form, in the polyvalent metal form, or in the mixed hydrogen-polyvalent metal form. The polyvalent metal or hydrogen form of the aluminosilicate component can be prepared by any of the wellknown methods described in the literature. Representative of such methods is ion-exchange of the alkali metal cations contained in the aluminosilicate with ammonium ions or other easily decomposable cations such as methyl-substituted quaternary ammonium ions. The exchanged aluminosilicate is then heated at elevated temperatures of about 300–600° C. to drive off ammonia, thereby producing the hydrogen form of the material. The degree of polyvalent-metal or hydrogen exchange should be at least about 20%, and preferably at least about 40% of the maximum theoretically possible. In any event, the crystalline aluminosilicate composition should contain less than about 6.0 wt. percent of the alkali metal oxide based on the final aluminosilicate composition and, preferably, less than 2.0 wt. percent, i.e. about 0.3 wt. percent to 0.5 wt. percent or less.

The resulting hydrogen aluminosilicates can be employed as such, or can be subjected to a steam treatment at elevated temperatures, i.e. 427 to 704° C. for example, to effect stabilization, thereof, against hydrothermal degradation. The steam treatment, in many cases, also appears to effect a desirable alteration in crystal structures resulting in improved selectivity.

The mixed hydrogen-polyvalent metal forms of the aluminosilicates are also contemplated. In one embodiment the metal form of the aluminosilicate is ion-exchanged with ammonium cations and then partially back-exchanged with solutions of the desired metal salts until the desired degree of exchange is achieved. The remaining ammonium ions are decomposed later to hydrogen ions during thermal activation. Here again, it is preferred that at least about 40% of the monovalent metal cations be replaced with hydrogen and polyvalent metal ions.

Suitably, the exchanged polyvalent metals are transition metals and are preferably selected from Groups VI–B and VIII of the Periodic Table. Preferred metals include nickel, molybdenum, tungsten and the like. The most preferred metal is nickel. The amount of nickel (or other metal) present in the aluminosilicate (as ion-exchanged metal) can range from about 0.1 to 20% by weight based on the final aluminosilicate composition.

In addition to the ion-exchanged polyvalent metals, the aluminosilicate may contain as non-exchanged constituents one or more hydrogenation components comprising the transitional metals, preferably selected from Groups VI–B and VIII of the Periodic Table and their oxides and sulfides. Such hydrogenation components may be combined with the aluminosilicate by any method which gives a suitably intimate admixture, such as by impregnation.

Examples of suitable hydrogenation metals, for use herein, include nickel, tungsten, molybdenum, platinum, and the like, and/or the oxides and/or sulfides thereof. Mixtures of any two or more of such components may also be employed. Particularly preferred metals are tungsten and nickel. Most preferably, the metals are used in the form of their oxides. The total amount of hydrogenation components present in the final aluminosilicate composition can range from about 1 to 50 wt. percent, preferably from 10 to 25 wt. percent based on the final aluminosilicate composition. The final weight percent composition of the crystalline component of the total catalyst will range from about 10 to 70 wt. percent and preferably from about 10 to 30 wt. percent, i.e. 20 wt. percent based on total catalyst.

The amorphous component and the crystalline aluminosilicate component of the second stage catalyst may be brought together by any suitable method, such as by mechanical mixing of the particles thereby producing a particle form composite that is subsequently dried and calcined. The catalyst may also be prepared by extrusion of wet plastic mixtures of the powdered components followed by drying and calcination. Preferably the complete catalyst is prepared by mixing the metal-exchanged zeolite component with alumina or silica-stabilized alumina and extruding the mixture to form catalyst pellets. The pellets are thereafter impregnated with an aqueous solution of nickel and molybdenum or tungsten materials to form the final catalyst.

BRIEF DESCRIPTION OF THE DRAWING

The drawing is a flow diagram of a preferred embodiment of the invention.

Referring to the drawing in detail, a feedstock consisting of a blend of 60 wt. percent deasphalted oil and 40 wt. percent heavy vacuum gas oil each obtained from West Texas crude is introduced by way of line 1 and line 2 into reaction zone 3. Hydrogen is added therein through line 2. The reaction zone contains an amorphous catalyst of the type as hereinbefore described. The molar ratio of hydrogen to feedstock is maintained in the first stage between about 1:1 and 25:1. The temperature in zone 3 is maintained between about 371 and 427° C. The hydrogen partial pressure ranges between about 1000 and 2500 p.s.i.g. and the space velocity of fresh feed ranges between about 0.3 to 1.5 (v./v./hr.). After about 15–500 minutes of contacting in zone 3, the liquid product is removed via line 4 and introduced into high pressure separator 5 wherein excess hydrogen and byproducts such as ammonia and hydrogen sulfide are removed via line 6. It is noted that, alternatively, separator 5 may be removed from the system and the liquid product from reaction zone 3 introduced directly into reaction zone 9 via line 4.

In the present embodiment, the liquid is removed from separator 5 and introduced into zone 9 via line 7. Hydrogen is admitted via line 8 into reaction zone 9 which contains an amorphous base-crystalline aluminosilicate catalyst of the type hereinbefore described.

The reaction conditions wtihin zone 9 include a reaction temperature in the range of about 260 to 316° C., a hydrogen partial pressure in the range of about 1000 to 2500 p.s.i.g. and a liquid hourly space velocity of second stage feed in the range of about 0.3 to 1.5 v./v./hr. After about 15 to 500 minutes of contacting, the liquid product is removed via line 10 and introduced into separator 11 wherein excess hydrogen and byproducts such as ammonia, H₂S and the like are removed via line 12 while the liquid product therefrom is removed via line 13 and introduced into distillation zone 14.

The liquid product is distilled at atmospheric pressure to remove overhead a lower boiling cut with a 5–95% boiling point range of about 93 to 375° C. The bottoms product is removed from zone 14 via line 16 and may be introduced into distillation zone 17 wherein it is distilled in vacuo to recover various lube distillate cuts via lines 18, 19 and 20. The resulting lube distillates comprise a first cut with a 5–95% boiling point range between about 354 to 510° C., a second cut with a 5–95% boiling point range between about 410 to 599° C., and a third cut with an initial boiling point above about 500° C. The lube cuts may be further processed such as by dewaxing in dewaxer 21 if lower pour point products are desired to yield dewaxed fractions through lines 22, 23 and 24.

DESCRIPTION OF THE PREFERRED EMBODIMENTS

The invention will be further understood by reference to the following examples which include a preferred embodiment of the invention.

Example 1

A blend of 60 liquid volume percent deasphalted oil (DAO) having an initial boiling point above about 500° C. and 40 liquid volume percent heavy vacuum gas oil (HVGO) with a 5–95% boiling point range between about 410 to 599° C., each secured from West Texas sour crude (WTS) was treated in a two-step process as shown in the drawing. Detailed feedstock inspection data is shown in Table III.

The first and second stage reactors were 1.25" in diameter with 0.25" central thermocouple well and contained catalyst beds 44" long. The reactors were operated in a single pass, isothermal, concurrent-downward flow operation.

A catalyst comprising nickel oxide and molybdenum oxide on a silica-alumina support was used in the first stage. The catalyst comprises about 4.5 wt. percent of nickel oxide and 13 wt. percent of molybdenum oxide based on total catalyst. The molar ratio of silica to alumina was about 1:5. The catalyst was pre-sulfided by conventional techniques prior to use, i.e. treatment with H₂S.

Reaction conditions in the first stage are shown in Table IV. The total liquid product from the first stage reaction zone was passed through a high pressure separator wherein the excess hydrogen and byproducts, i.e. H₂S, ammonia and the like, were separated. Thereafter, the liquid was introduced into the second stage of the process. It is noted that Run 5 was conducted in a "sour" environment, that is, in the presence of H₂S and ammonia.

The second stage catalyst comprised a molecular sieve component and an amorphous component. The sieve component comprised about 20 wt. percent of the total catalyst and consisted of a nickel-exchanged synthetic faujasite. The amorphous component comprised an alumina support and the sieve/support combination was believed to have been impregnated, after admixture, with NiO and WO₃. The catalyst was sulfided with H₂S prior to contacting with the first stage effluent, thereby converting at least a portion of the NiO and WO₃ to their respective sulfides. The total amount of nickel present in the complete catalyst prior to sulfiding was 4.9 wt. percent (calculated as nickel oxide), while the total amount of WO₃ present in the catalyst prior to sulfiding was 21.5 wt. percent, based on total catalyst.

The second stage was operated at several different temperatures ranging from 260 to 316° C. In order to determine the effect of temperature on the process efficiency. Other operational parameters in the second stage are shown in Table IV.

The products from the second stage reactor were subsequently distilled and dewaxed to yield a first fraction with a 5–95% boiling point range of about 371 and 496° C., a second fraction with a 5–95% boiling point range of about 496 and 566° C., and a third fraction with an initial boiling point above about 566° C.

In Table IV and V is shown the effect of the subject two-stage hydrocracking process on lube oil color and $VI_E$ distribution.

From the data it is evident that a significant product color improvement was obtained with the use of the second stage treatment. Additionally, it is noted that the $VI_E$ distribution after second stage treatment was not only more uniform but approached higher and more desirable values.

Moreover, it was determined that a second stage temperature of about 316° C. was most desirable in achieving the beneficial results of the subject process.

Silica gel-liquid phase chromatographic separation data on the dewaxed lube products from the above experiment are tabulated in Table VI.

It is noted that lube cuts from the first stage reactor contain about 5.3 to 17.8 wt. percent aromatic and polar compounds, depending on the boiling point range of the lube cut. The concentration of these compounds is reduced considerably in all lube cuts following second stage treatment. The greatest improvement was obtained in Run 1 wherein the second stage reaction temperature was maintained at approximately 316° C. However, it is noted that there was appreciable improvement even in Runs 2–4 where the reaction conditions were less severe. The substantial conversion of aromatic and polar compounds from the lube cuts accounts for the excellent color and UV stability of the lube oil products.

UV stability data relating to a one-step operation vis-à-vis the two-step operation of the subject invention is summarized in Table VII. The data refer to lube cuts obtained from Example 1. The results are compared to the minimum time requirements established for lubes prepared via conventional processes, i.e. hydrocracking followed by solvent extraction.

It is noted that there was a significant increase in the overall UV stability of lube oils prepared via the two-stage process of the subject invention. Moreover, the results of the two-stage process compare favorably with those of the conventional operation wherein an expensive solvent extraction step is used following a hydrocracking operation.

An unexpected result from use of the instant process involves the formation of significant amounts of jet fuels along with the lube oil products. The process, therefore, allows the flexibility to produce various lube/fuels combinations depending on demand. In this respect Table VIII summarizes the composition of the total liquid product from the experiments.

A yield of 17.2 wt. percent of jet fuels, i.e. boiling point 177–268° C., based on total feed to the first stage, was obtained in Run 1 at a reaction temperature of approximately 316° C. The results suggest inferentially that higher conversion to jet fuels can be obtained if more severe reaction conditions are employed.

In summary then, the subject process affords the following advantages relative to conventional combination hydrocracking/extraction processes:

(1) The preparation of lube oils with low color intensity.
(2) The preparation of lube oils with UV stability.
(3) The preparation of lube oils with high $VI_E$ and substantially uniform $VI_E$ distribution.
(4) The production of substantial amounts of jet fuel as by-product.

Example 2

Several experiments were conducted wherein the first and second stage catalysts were varied to determine the effect of catalyst structure on the overall process efficiency. In the first set of experiments the first stage catalyst was identical to that used in Example 1. The second stage catalyst comprised a mixture of 5 wt. percent based on total catalyst nickel-exchanged faujasite and 95 wt. percent based on total catalyst of $P_2O_5$ and silica-stabilized alumina, the faujasite/stabilized alumina combination containing NiO and $MoO_3$ that were believed to have been deposited thereon after admixture of the faujasite and alumina. The results of the experiments along with the reaction conditions under which the experiments were performed are displayed in Tables IX, X and XI.

Comparing the performance of the second stage catalyst used in Examples 1 and 2, it is clear that the 20 wt. percent sieve catalyst is superior vis-à-vis the low sieve-content catalyst in providing (1) lube products of high uniform viscosity index distribution and (2) lube products of low color intensity. Specifically, comparing Runs 3 and 4 in Table X with Run 1 in Table IV, the following points are noted:

(1) Lower second stage reaction temperatures, i.e. 316° C. versus 372° C., were required in Example 1 to attain high uniform viscosity index distributions.

(2) Color intensities of the lube oil products obtained by use of the low sieve-content catalyst were quite high vis-à-vis the 20 wt. percent sieve catalyst.

(3) Although not shown, UV stabilities of the lube oil products derived from use of the low sieve-content catalyst were quite poor vis-à-vis the 20 wt. percent sieve catalyst. Thus, the former lube oil products rapidly discolored and precipitated sludge in 2 to 4 days as compared with 6 to 26 days for the latter prepared lube oil products.

(4) The yield of jet fuel products with boiling points ranging between 177 and 268° C. was generally quite low when the low sieve-content catalyst was used in the second stage of the process vis-à-vis the 20% sieve-containing catalyst.

Example 3

As a further investigation into the effect of the amount of sieve contained in the second stage catalyst on lube product quality, a high content-sieve catalyst was used in the second stage reactor and comprised a mixture of approximately 80 wt. percent synthetic faujasite (3 wt. percent magnesium-exchanged, the remainder of the faujasite being substantially hydrogen-exchanged) based on total catalyst, and approximately 20 wt. percent alumina binder, based on total catalyst, the mixture containing about 0.5 wt. percent, based on total catalyst, of palladium.

In Tables XII–XVI data are tabulated relating to the properties of the lube oil products derived from the two-stage hydrocracking process wherein the high sieve-content catalyst was used in the second stage reactor.

It is noted that there was no significant $VI_E$ distribution improvement after second stage treatment. While not shown, the color intensity of the lube oil products was high. Referring to Table XV, it is noted that the UV stability was quite good for each of the lube products. With regard to Table XVI, the overall yield of jet fuel product based on feed to the first stage of the process was low. The data suggest inferentially that catalysts with sieve content of at least about 80 wt. percent, based on total catalyst, are unsatisfactory as second stage catalysts in the subject process.

Experiments were conducted wherein the metals exchanged on the faujasite component of the high sieve content catalyst were varied. The experimental results indicated no substantial change in the overall catalyst performance. Thus, for example, a non-noble metal catalyst comprising approximately 80 wt. percent of a catalyst metal-containing faujasite (admixed and/or ion-exchanged with 1.4 wt. percent nickel and 13.5 wt. percent tungsten) admixed with approximately 20 wt. percent of a clay binder, did not display any enhanced activity with regard to $VI_E$ improvement, color improvement or UV stability improvement of the final lube products vis-à-vis the noble metal, i.e. palladium and magnesium ion-exchanged sieve-containing catalyst.

TABLE III

| | |
|---|---|
| Feedstock | Blend.[1] |
| $V_{210}$, SUS | 159.1. |
| Gravity, °API | 19.6. |
| RI at 60° C. | 1.5054. |
| C, wt. percent | 85.9. |
| H, wt. percent | 12.2. |
| S, wt. percent | 1.37. |
| N, p.p.m. | 1100. |
| Fe, p.p.m. | 1.7. |
| Ni, p.p.m. | 0.7. |
| V, p.p.m. | 1.0. |
| Dewaxed oil: | |
| Dry wax, wt. percent | 9.2. |
| $V_{100}$, SUS | 6035. |
| $V_{210}$, SUS | 194. |
| $VI_E$ | 60. |
| Distillation cuts—inspection data: | |
| Initial—496° C. wt. percent | 9.6. |
| Dry wax, wt. percent | 8.4. |
| $V_{100}$, SUS | 928. |
| $V_{210}$, SUS | 67.0. |
| $VI_E$ | 25. |
| Color, ASTM | D8. |
| 496° C.–566° C., wt. percent | 45.2. |
| Dry wax, wt. percent | 9.6. |
| $V_{100}$, SUS | 3475. |
| $V_{210}$, SUS | 131.8. |
| $VI_E$ | 42. |
| Color, ASTM | D8. |
| 566° C.+, wt. percent | 45.2. |
| Dry wax, wt. percent | 9.6. |
| $V_{100}$, SUS | 17673. |
| $V_{210}$, SUS | 402. |
| $VI_E$ | 77. |
| Color, ASTM | D8. |

[1] Blend of 40 LV percent WTS-HVGO and 60 LV percent DAO.

TABLE IV.—TWO-STAGE LUBE HYDROCRACKING TOTAL LIQUID PRODUCT INSPECTIONS

| | | Stage | | | | |
|---|---|---|---|---|---|---|
| | | 1st | 2d | | | |
| | | | Operation—Pure $H_2$ | | | |
| | | | Run number | | | |
| | Feed[1] | | 1 | 2 | 3 | 4 | [2]5 |
| Reaction temp., °C | | 388 | 316 | 260 | 288 | 288 | 318 |
| Space velocity, v./v./hr | | 0.5 | 0.5 | 0.5 | 0.5 | 0.5 | 0.49 |
| Pressure, p.s.i.g. $H_2$ | | 2,500 | 2,500 | 2,500 | 500 | 1,500 | 2,500 |
| Gas rate, s.c.f. $H_2$/B | | 5,000 | 5,000 | 5,000 | 5,000 | 5,000 | 5,000 |
| Average catalyst age, hr | | 394 | 105 | 154 | 194 | 231 | 619 |
| Total liquid product: | | | | | | | |
| Recovery on feed, wt. percent (first or second stage) | 100 | 98 | 98 | 99 | 199 | 100 | 102 |
| Gravity, °API | 19.9 | 29.8 | 35.1 | 29.8 | 30.8 | 30.5 | 30.3 |
| RI at 60° C | 1.5054 | 1.4675 | 1.4508 | 1.4655 | 1.4625 | 1.4641 | 1.4645 |
| 371° C., conversion[3] wt. percent | | 17.3 | 38.0 | 18.9 | 20.6 | 19.0 | 16.6 |
| Nitrogen, p.p.m | 1,900 | 6.1 | <1 | <1 | | | |
| Sulphur, wt. percent | 1.37 | 0.06 | <0.06 | <0.06 | | 0.09 | |
| TLP colour, ASTM[4] | D8.0 | 4.0 | 0.0 | 0.0 | 0.0 | 0.0 | 0.0 |

[1] WTS-3 feedstock (West Texas Sour 60% DAO blend/40% HVGO).
[2] (Run in the presence of $H_2$+$NH_3$+$H_2S$, i.e. sour conditions), 408 cc. t-butyl mercaptan and 58 cc. n-butylamine added/gal. feed to 2d stage.
[3] Based on WTS-3 feed to first stage.
[4] Determined by method as described in ASTM Standards, 17, p. 567, Jan. 1967.

TABLE V.—TWO-STAGE LUBE HYDROCRACKING LUBE INSPECTIONS

| | | Stage | | | |
|---|---|---|---|---|---|
| | | 1st | 2d | | |
| | | | Run number | | |
| | Feed[1] | 1 | 2 | 3 | 4 |
| 371–496° cut: | | | | | |
| Yield on WTS-3 feed, wt. percent | 9.6 | 28.3 | 18.7 | 23.2 | 23.9 | 24.4 | 25.8 |
| Waxy color, ASTM | | <1.5 | <0.0 | | | |
| Dry wax on lube cut, wt. percent | 8.4 | 8.2 | 12.0 | 8.9 | 8.3 | 9.6 | 9.2 |
| Dewaxed oil: | | | | | | |
| Yield on WTS-3, wt. percent | 8.8 | 26.0 | 16.5 | 21.2 | 22.0 | 22.1 | 23.4 |
| Viscosity 100° F., SUS | 928 | 233 | 172 | 242 | 217 | 23 | 236 |
| Viscosity 210° F., SUS | 67.0 | 46.9 | 44.6 | 42.5 | 46.5 | 46.0 | 47.1 |
| $VI_E$[3] | 25 | 76 | 98 | 77 | 83 | 80 | 77 |
| Color, ASTM[4] | | 2.5 | <0.5 | <1.0 | <0.5 | <1.5 | <1.5 |
| 496–566° C. cut: | | | | | | |
| Yield on WTS-3 feed, wt. percent | 45.2 | 28.3 | 22.7 | 32.8 | 31.3 | 30.2 | 33.2 |
| Waxy color, ASTM | D8 | 2.5 | <0.5 | | | |
| Dry wax on lube cut, wt. percent | 9.6 | 15.2 | 19.7 | 15.7 | 16.5 | 15.3 | 14.8 |
| Dewaxed oil: | | | | | | |
| Yield on WTS-3, wt. percent | 40.9 | 24.0 | 18.2 | 27.6 | 26.1 | 25.6 | 28.3 |
| Viscosity 100° F., SUS | 3475 | 947 | 768 | 910 | 883 | 846 | 921 |
| Viscosity 210° F., SUS | 131.8 | 81.4 | 76.6 | 79.6 | 79.2 | 76.7 | 80.9 |
| $VI_E$[3] | 42 | <85 | 94 | 84 | 78 | 84 | 87 |
| Color, ASTM[4] | D8.0 | <4.5 | 1.0 | <1.0 | <1.0 | <2.0 | <2.5 |
| 566° C. plus cut: | | | | | | |
| Yield on WTS-3 feed, wt. percent | 45.2 | 26.1 | 20.6 | 25.1 | 24.2 | 28.1 | 24.4 |
| Waxy color, ASTM | D8 | <6.5 | <1.0 | | | |
| Dry wax on lube cut, wt. percent | 9.6 | 18.8 | 21.9 | 22.5 | 19.8 | 19.5 | 19.3 |
| Dewaxed oil: | | | | | | |
| Yield on WTS-3, wt. percent | 40.9 | 21.2 | 16.1 | 19.4 | 19.4 | 22.6+ | 19.7 |
| Viscosity 100° F., SUS | 17,673 | 3,005 | 2874 | 3,133 | 3,150 | 2,820 | 3,248 |
| Viscosity 210° F., SUS | 402 | 171.5 | 172.9 | 176.8 | 178.6 | 165.0 | 179.4 |
| $VI_E$[3] | 77 | 97 | 101 | 97 | 98 | 97 | 97 |
| Color, ASTM[4] | D8.0 | <8.0 | <1.5 | <2.0 | <2.5 | 2.5 | <4.0 |

[1] WTS-3 feedstock (West Texas Sour 60% DAO Blend/40% HVGO).
[2] Run in the presence of $H_2$+$NH_3$+$H_2S$, i.e. sour conditions, 408 cc. t-butyl mercaptan and 58 cc. n-butylamine added/gal. feed to 2d stage.
[3] Determined by method as described in ASTM Standards, 17, p. 810, Jan. 1967, i.e. D 2279-64.
[4] Determined by method as described in ASTM Standards, 17, p. 565, Jan. 1967.

TABLE VI.—TWO-STAGE LUBE HYDROCRACKING SILICA GEL SEPARATION OF DEWAXED LUBE PRODUCTS

|  | 1st stage | 2d stage | | | | |
|---|---|---|---|---|---|---|
|  | Feedstock, WTS-3 | Total liquid product from 1st stage | | | | |
|  |  | Run number | | | | |
|  |  | [1]1 | [1]2 | [1]3 | [1]4 | [2]5 |
| Dewaxed 371–496° C. cut (wt. percent): | | | | | | |
| Saturates | 82.2 | 98.7 | 88.5 | 95.5 | 90.9 | 89.6 |
| Aromatics | 16.8 | 0.9 | 10.9 | 4.2 | 8.7 | 10.1 |
| Polars | 1.0 | 0.4 | 0.6 | 0.3 | 0.4 | 0.3 |
| Dewaxed 496–566° C. cut (wt. percent): | | | | | | |
| Saturates | 89.2 | 98.7 | 92.4 | 95.8 | 93.2 | 93.1 |
| Aromatics | 10.1 | 1.1 | 7.1 | 3.9 | 6.4 | 6.5 |
| Polars | 0.7 | 0.2 | 0.5 | 0.3 | 0.4 | 0.4 |
| Dewaxed 566° C. plus cut (wt. percent): | | | | | | |
| Saturates | 94.7 | 99.0 | 96.0 | 97.0 | 96.0 | 96.6 |
| Aromatics | 4.8 | 0.8 | 3.5 | 2.6 | 3.5 | 3.2 |
| Polars | 0.5 | 0.2 | 0.5 | 0.4 | 0.5 | 0.2 |

[1] In the presence of pure hydrogen.
[2] Run in the presence of $H_2+NH_3+H_2S$, i.e. sour conditions.

TABLE VII.—UV STABILITY DATA [1]

| Dewaxed lube | 1st stage | 1st stage/ 2d stage | Conventional hydrocracking followed by solvent extraction [2] |
|---|---|---|---|
| 371–496° C. cut | [3]3 | [4]6 | 7 |
| 496–566° C. cut | [3]3 | [4]8 | 10 |
| 566° C. + cut | [3]2 | +26 | 20 |

[1] 10 ml. of the lube fractions was placed in a vial with 40 ml. capacity, lightly stoppered (preferably with a cotton plug), and placed in a southern exposure window. The numbers refer to days in the window till appearance of sludge deposit.
[2] Minimum acceptable times considered satisfactory for high UV stable lube oils.
[3] Heavy dark sludge.
[4] Trace pale sludge.

TABLE VIII.—TWO-STAGE LUBE HYDROCRACKING PROCESS FUELS BY HIGH VACUUM DISTILLATION

|  |  | Stage | | | | |
|---|---|---|---|---|---|---|
|  |  | 1st | 2d | | | |
|  |  |  | Operation—Pure $H_2$ | | | |
|  | Feed [1] | Run No. 1 | Run No. 2 | Run No. 3 | Run No. 4 | Run No. 5 [2] |
| Yield on WTS-3 feed, wt. percent: | | | | | | |
| IBP, 94° C | | 0.5 | 0.2 | 0.2 | 0.2 | 0.2 | 0.2 |
| Naphtha, 94–177° C | | 3.0 | 5.8 | 1.5 | 2.0 | 2.5 | 2.0 |
| Jet fuel, 177–268° C | | 2.5 | 17.2 | 4.5 | 5.4 | 2.4 | 5.5 |
| Heating oil, 268–344° C | | 6.0 | 8.1 | 6.4 | 8.0 | 8.5 | 6.1 |
| Catalyst feed, 344–372° C | | 3.1 | 2.5 | 3.4 | 2.2 | 2.9 | 2.5 |
| Waxy lube, 372° C | 100 | 82.7 | 62.1 | 79.4 | 79.3 | 81.4 | 83.4 |

[1] WTS-3 feedstock (West Texas Sour 60% DAO blend/40% HVGO).
[2] Run in the presence of $H_2+NH_3+H_2S$, i.e. sour conditions, 408 cc. t-butyl mercaptan and 58 cc. n-butylamine added/gal. feed to second stage.

TABLE IX.—TWO-STAGE HYDROCRACKING OVER AMORPHOUS AND LOW SIEVE-CONTENT CATALYSTS FEED AND TOTAL LIQUID PRODUCT INSPECTIONS

|  |  | Stage | | | |
|---|---|---|---|---|---|
|  |  | 1st [2] | 2d [3] | | |
|  | WTS-3 feed [1] |  | Run numbers | | |
|  |  |  | 1 | 2 | 3 | 4 |
| Reaction temperature, °C |  | 388 | 316 | 344 | 372 | 372 |
| Space velocity, v./v./hr |  | 0.5 | 0.41 | 0.48 | 0.52 | 0.50 |
| Pressure, p.s.i.g. $H_2$ |  | 2,500 | 2,500 | 2,500 | 2,500 | 1,500 |
| Gas rate, s.c.f./b |  | 5,000 | 5,000 | 5,000 | 5,000 | 5,000 |
| Average catalyst age, hrs |  | 395 | 470 | 505 | 549 | 589 |
| Total liquid products: | | | | | | |
| Recovery, wt. percent | 100 | 98 | 102 | [4]100 | 98 | 99 |
| Gravity, °API | 19.9 | 29.8 | 30.0 | 30.5 | 33.9 | 33.3 |
| RI at 60° C | 1.5054 | 1.4675 | 1.4648 | 1.4634 | 1.4550 | 1.4586 |
| Conversion, wt. percent [5] | 0 | 17.3 | 13.3 | 15.0 | 29.8 | 27.7 |
| T.L.P. colour, ASTM | D8.0 | 4.0 | <0.5 | <1.0 | <1.0 | 2.5 |

[1] WTS-3 feedstock (West Texas Sour (60% DAO Blend/40% HVGO)).
[2] 4.5 wt. percent NiO, 13.0 wt. percent $MoO_3$ on silica-alumina support.
[3] 95 wt. percent (NiO, $MoO_3$)/$P_2O_5$ on silica-alumina support and 5 wt. percent Ni-exchanged faujasite, based on total catalyst.
[4] Estimated.
[5] 100 wt. percent yield 372° C. + based on feed to first stage or second stage respectively.

TABLE X.—TWO-STAGE HYDROCRACKING OVER AMORPHOUS AND LOW SIEVE-CONTENT CATALYSTS LUBE INSPECTIONS

| | | Stage | | | |
|---|---|---|---|---|---|
| | | 1st [1] | 2d [2] | | |
| | | | Run number | | |
| | WTS-3 feed | 1 | 2 | 3 | 4 |
| 371–496° C. cut: | | | | | |
| Yield on feed to R-1 [3] or R-2 [3], wt. percent | 9.6 | 28.3 | 27.8 | 26.3 | 25.5 | 27.3 |
| Dry wax on lube cut, wt. percent | 8.4 | 8.2 | 8.5 | 9.8 | 9.4 | 8.7 |
| Dewaxed oil: | | | | | |
| Yield on feed, wt. percent | 8.8 | 26.0 | 25.4 | 23.7 | 23.1 | 24.9 |
| Viscosity 100° F., SUS | 928 | 233 | 239 | 217 | 177 | 149 |
| Viscosity 210° F., SUS | 67.0 | 46.9 | 47.3 | 46.4 | 44.8 | 43.3 |
| $VI_E$ | 25 | 76 | 78 | 82 | 96 | 102 |
| Color, ASTM | | 2.5 | <1.5 | 1.5 | <2.0 | 2.0 |
| 496–566° C. cut: | | | | | |
| Yield on feed to R-1 [3] or R-2 [3], wt. percent | 45.2 | 28.3 | 31.8 | 33.0 | 24.9 | 25.7 |
| Dry wax on lube cut, wt. percent | 9.6 | 15.2 | 14.5 | 15.2 | 17.8 | 17.2 |
| Dewaxed oil: | | | | | |
| Yield on feed, wt. percent | 40.9 | 24.0 | 27.2 | 28.0 | 20.5 | 21.3 |
| Viscosity 100° F., SUS | 3,475 | 947 | 908 | 826 | 657 | 586 |
| Viscosity 210° F., SUS | 131.8 | 81.4 | 79.5 | 76.0 | 71.5 | 68.4 |
| $VI_E$ | 42 | 85 | 84 | 85 | 96 | 98 |
| Color, ASTM | D8.0 | <4.5 | <2.0 | <3.0 | <3.0 | <5.0 |
| 566° C. plus cut: | | | | | |
| Yield on feed to R-1 [3] or R-2 [3], wt. percent | 45.2 | 26.1 | 27.2 | 25.7 | 19.8 | 19.3 |
| Dry wax on lube cut, wt. percent | 9.6 | 18.8 | 19.8 | 20.7 | 21.7 | 19.6 |
| Dewaxed oil: | | | | | |
| Yield on feed, wt. percent | 40.9 | 21.2 | 21.8 | 20.4 | 15.5 | 15.5 |
| Viscosity 100 °F., SUS | 17,673 | 3,005 | 3,003 | 4,226 | 2,088 | 1,944 |
| Viscosity, 210° F., SUS | 402 | 171.5 | 172.2 | 167.1 | 145.3 | 140.5 |
| $VI_E$ | 77 | 97 | 98 | 98 | 105 | 107 |
| Color, ASTM | D8.0 | <8.0 | <3.5 | <4.5 | <5.0 | D8.0 |

[1] 4.5 wt. percent NiO, 13.0 wt. percent $MoO_3$ on silica-alumina support.
[2] 95 wt. percent (NiO, $MoO_3$)/$P_2O_5$ on silica-alumina support and 5 wt. percent Ni-exchanged faujasite based on total catalyst.
[3] First and second stage, respectively.

TABLE XI.—TWO-STAGE HYDROCRACKING OVER AMORPHOUS AND LOW SIEVE-CONTENT CATALYSTS FUELS YIELDS BY DISTILLATION

| | | Stage | | | |
|---|---|---|---|---|---|
| | | 1st [1] | 2d [2] | | |
| | | | Run number | | |
| | WTS-3 feed | 1 | 2 | 3 | 4 |
| Yield on feed to 1st stage or second stage, wt. percent | | | | | |
| IBP, 94° C | | 0.5 | 0.2 | 0.2 | | |
| Naphtha, 94–177° C | | 3.0 | 2.0 | 1.0 | [3] 4.5 | [3] 3.1 |
| Jet fuel, 177–268° C | | 2.5 | 3.3 | 3.7 | 10.9 | 10.4 |
| Heating oil, 268–344° C | | 6.0 | 7.1 | 6.6 | 8.3 | 8.8 |
| Catalyst feed, 344–372° C | | 3.1 | 2.7 | 2.6 | 3.9 | 4.0 |
| Waxy lube, 372° C.+ | 100 | 82.7 | 86.7 | 85.0 | 70.4 | 72.7 |

[1] 4.5 wt. percent NiO, 13.0 wt. percent $MoO_3$ on silica-alumina support.
[2] 95% (NiO, $MoO_3$)/$P_2O_5$ on silica-alumina support and 5% Ni exchanged faujasite.
[3] Initial boiling point, 177° C.

TABLE XII

Inspection on feedstocks to first stage

| | |
|---|---|
| Feedstock | Aramco DAO. |
| Initial boiling point [1] | 498° C. |
| Sulphur, wt. percent | 2.33. |
| Nitrogen, wt. percent | 0.14. |
| Gravity, ° API | 20.0. |
| Metals: | |
| P.p.m. Ni | 0.4. |
| P.p.m. V | 1.3. |
| P.p.m. Fe | 0.4. |
| $V_{210}$, waxy, SUS | 169. |
| Wax, wt. percent | 8.1. |
| $V^{210}$, DWO, SUS | 185. |
| VI DWO | 76. |
| RI at 60° C. | 1.5002. |

[1] 5% cut point by high vacuum distillation.

TABLE XIII.—TOTAL LIQUID INSPECTIONS FOR TWO-STAGE HYDROCRACKING USING AMORPHOUS AND HIGH SIEVE-CONTENT CATALYSTS

| | | Stage | | |
|---|---|---|---|---|
| | | 1st [1] | 2d [2] | |
| | Feed | | TLP from 1st Stage | |
| | Feedstock, Aramco DAO | | Run number | |
| | | 1 | 2 | 3 |
| Temperature, ° C | | 360 | 318 | 332 | 303 |
| LHSV, v./v./hr | | 0.26 | 0.95 | 0.92 | 0.82 |
| Pressure, p.s.i.g. $H_2$ | | 2,500 | 2,500 | 2,500 | 2,500 |
| Gas rate, S.C.F. H2/B | | 5,000 | 5,000 | 5,000 | 5,000 |
| Average cat. age, hrs | | 1,230 | 8 | 48 | 58 |
| Total liquid product: | | | | | |
| R.I. at 60° C | 1.5002 | 1.4817 | 1.4512 | 1.4370 | 1.4639 |
| Gravity, °API | 20.0 | 25.9 | 37.5 | 44.9 | 31.9 |
| Recovery, wt. percent | | 96.7 | 73.8 | 73.6 | 94.5 |
| Nitrogen, p.p.m | 1,400 | 61 | 30 | | 41 |
| Sulphur, wt. percent | 2.33 | | 0.07 | 0.10 | 0.29 |
| Carbon, wt. percent | 85.19 | 86.93 | 85.58 | 85.33 | 86.12 |
| Hydrogen, wt. percent | 12.14 | 13.12 | 13.80 | 14.30 | 13.55 |

[1] 4.5 wt. percent NiO, 13.0 wt. percent $MoO_3$ on silica-alumina support.
[2] High content-sieve catalyst comprising about 80 wt. percent faujasite (partially exchanged with palladium and magnesium) and about 20 wt. percent clay binder based on total catalyst.

TABLE XIV.—LUBE INSPECTIONS FOR TWO-STAGE HYDROCRACKING EMPLOYING AMORPHOUS AND HIGH SIEVE-CONTENT CATALYSTS

|  | Stage | | | |
|---|---|---|---|---|
|  | 1st [1] | 2d [1] | | |
|  | Feedstock, Aramco DAO | TLP from 1st stage | | |
|  |  | Run number | | |
|  |  | 1 | 2 | 3 |
| 371° C. plus cut: |  |  |  |  |
| Waxy yield, wt. percent [2] | 93.4 | 43.0 | 27.1 | 69.9 |
| Wax, wt. percent [3] | 18 | 29 | 38 | 51 |
| DWO yield, wt. percent [3] | 77.0 | 30.6 | 16.7 | 34.2 |
| Viscosity at 100° F., SUS | 2,039 | 2,092 | 1,947 | 1,897 |
| Viscosity at 210° F., SUS | 121.5 | 127.4 | 121.9 | 118.7 |
| VI$_E$ | 83 | 87 | 87 | 86 |
| 455° C. plus cut: |  |  |  |  |
| Waxy yield, wt. percent [2] | 89.7 | 41.5 | 25.9 | 66.9 |
| Wax, wt. percent [3] | 18 | 26 | 47 | 46 |
| DWO yield, wt. percent [3] | 73.5 | 30.9 | 13.8 | 33.9 |
| Viscosity at 100° F., SUS | 2,228 | 2,380 | 2,261 | 2,329 |
| Viscosity at 210° F., SUS | 128.5 | 136.8 | 131.7 | 128.1 |
| VI$_E$ | 84 | 87 | 86 | 79 |
| 511° C. plus cut: |  |  |  |  |
| Waxy yield, wt. percent [2] | 77.7 | 37.6 | 23.7 | 59.3 |
| Wax, wt. percent [3] | 26 | 37 | 49 | 48 |
| DWO yield, wt. percent [3] | 57.7 | 23.8 | 12.1 | 31.1 |
| Viscosity at 100° F., SUS | 2,701 | 2,952 | 3,068 | 2,724 |
| Viscosity at 210° F., SUS | 146.5 | 154.3 | 155.9 | 146.5 |
| VI$_E$ | 86 | 86 | 85 | 86 |

[1] Refer to Table XIII for catalyst definition.
[2] Based on feed to 1st stage.
[3] Dewaxing conditions: 15% MEK/85% MIBK (3 solvent/1 oil), at −25° C.

TABLE XV

Daylight stability of lubes from two-stage hydrocracking

Run No.: Days to form sludge
1 (371° C.+) _____ 44 Pass.
2 (371° C.+) _____ >44 ⎫ Pass.
3 (371° C.+) _____ 44 ⎭

TABLE XVI.—YIELDS (WEIGHT PERCENT ON FEED TO 1st STAGE) OF FUELS

|  | Feedstock, Aramco DAO | | | | |
|---|---|---|---|---|---|
|  | Stage | | | | |
|  | 1st [1] | 2d [1] | | | |
|  |  | Run number | | | |
|  |  | 1 | 2 | 3 | 4 |
| Dist'n. type | ([2]) | ([2]) | ([2]) | ([2]) | [3]15.5 |
| Percent conversion [4,5] | 6.6 | 30.1 | 57 | 72.9 | 72.9 |
| Percent recovery [4] | 96.7 | 91.4 | 71.3 | 71.1 | 71.1 |
| Boiling range, ° C.: |  |  |  |  |  |
| 1–82 |  |  |  |  | 4.1 |
| 82–177 | [6]0.2 | [6]7.6 | [6]17.9 | [6]29.4 | 30.5 |
| 177–288 | 1.2 | 10.8 | 8.6 | 13.2 | 8.1 |
| 288–342 | 1.4 | 2.3 | 1.1 | 1.0 | 1.1 |
| +342 | 94.0 | 70.7 | 43.7 | 27.5 | 27.1 |

[1] Refer to Table XIII for catalyst definitions.
[2] In vacuo (simple).
[3] 15 theoretical stages, 5/1 reflux ratio.
[4] Percent conversion=100 wt. percent yield 372° C. plus based on feed to first or second stage, respectively.
[5] Based on feed to first stage.
[6] Boiling range 1–177° C.

What is claimed is:

1. A process for the preparation of lubricating oils comprising the steps of:
   (a) contacting a hydrocarbon feedstock, a major portion of which boils above about 340° C. at atmospheric pressure, with hydrogen at hydrocracking conditions in the presence of a catalyst selected from the group consisting of (1) a catalyst comprising a mixture of a major amount of an amorphous base component and a minor amount of a hydrogenation component and (2) a catalyst comprising a mixture of a major amount of an amorphous base component and minor amounts of a crystalline aluminosilicate component comprising less than about 9 wt. percent of the total catalyst, and a hydrogenation component, said contacting conducted at a temperature ranging between about 260 and 538° C., at a hydrogen partial pressure ranging between about 600 and 10,000 p.s.i.g. and at a hydrocarbon feedstock space velocity ranging between about 0.1 and 10 v./v./hr.;
   (b) contacting at least a portion of the effluent from step (a), with hydrogen at hydrocracking conditions in the presence of a catalyst comprising a mixture of (1) an amorphous base component, (2) a crystalline aluminosilicate component comprising 10 to 70 wt. percent of the total catalyst and having a $$SiO_2:Al_2O_3$$

mole ratio of at least 2.5 and an alkali metal content of less than about 2.0 wt. percent (as alkali oxide), based on the total aluminosilicate component, and (3) a hydrogenation component, said contacting in step (b) conducted under less severe conditions of temperature, hydrogen partial pressure and space velocity than are used in said first stage, and wherein said temperature ranges between about 260° and 316° C., said hydrogen partial pressure ranges between about 600 and 10,000 p.s.i.g. and said hydrocarbon feed space velocity ranges between about 0.1 and 10 v./v./hr., and recovering a lubricating oil.

2. The process of claim 1 wherein the contacting of the effluent from step (a) is conducted at a temperature ranging between about 371° and 427° C., at a hydrogen partial pressure ranging between about 1000 and 2500 p.s.i.g. and at a hydrocarbon feed space velocity ranging between about 0.3 and 1.5 v./v./hr.

3. The process of claim 1 wherein the contacting of the effluent from step (b) is conducted at a temperature ranging between about 260° C. and 316° C., at a hydrogen partial pressure ranging between about 1000 and 2500 p.s.i.g. and at a hydrocarbon feed space velocity ranging between about 0.3 and 1.5 v./v./hr.

4. The process of claim 1 wherein the catalyst of step (a) comprises a mixture of a silica-alumina amorphous base component and a hydrogenation component selected from the group consisting of molybdenum and nickel sulfides, molybdenum and nickel oxides and mixtures thereof.

5. The process of claim 1 wherein the catalyst of step (a) comprises a mixture of a nickel-exchanged faujasite and at least about 95 wt. percent (based on total catalyst) of a mixture of molybdenum oxide and nickel oxide deposited on a $P_2O_5$-stabilized silica/alumina base.

6. The process of claim 1 wherein said crystalline aluminosilicate component of the catalyst of step (b) comprises 10–30 wt. percent of the total catalyst.

7. The process of claim 1 wherein the catalyst of step (b) comprises a mixture of about 20 wt. percent based on total catalyst, of a nickel-exchanged faujasite, alumina and hydrogenation components selected from the group consisting of the oxides and sulfides of nickel, tungsten and molybdenum and mixtures thereof.

8. A process for the preparation of a lubricating oil having a substantially uniform VI$_E$ distribution, reduced aromatic and organic polar compound content, low color intensity and UV stability from a petroleum oil feedstock, a predominant portion of which boils above about 340° C. at atmospheric pressure and containing aromatic and organic polar compounds, said process comprising:
   (a) contacting said petroleum oil feedstock at hydrocracking conditions with hydrogen in the presence of a catalyst selected from the group consisting of (1) a catalyst comprising a mixture of a major amount of an amorphous base component and a minor amount of a hydrogenation component and (2) a catalyst comprising a mixture of a major amount of an amorphous base component and minor amounts of a crystalline aluminosilicate zeolite component comprising less than about 5 wt. percent of the total catalyst and a hydrogenation component, said contacting resulting in the conversion of at least a portion of the higher boiling hydrocarbons of the feedstock to lower boiling hydrocarbons;

(b) contacting at least a portion of the effluent from step (a) with hydrogen at hydrocracking conditions in the presence of a catalyst comprising a mixture of (1) an amorphous base component, (2) a crystalline aluminosilicate zeolite component comprising 10–30 wt. percent of the total catalyst and having a $$SiO_2:Al_2O_3$$

mole ratio of at least 2.5 and an alkali metal content of less than about 2.0 wt. percent (as alkali oxide), based on total aluminosilicate zeolite component, and (3) a hydrogenation component, said contacting resulting in the conversion of a major portion of said aromatic and organic polar compounds and at least a portion of the lower boiling hydrocarbons of said feedstock; and (c) recovering a lubricating oil product of substantially uniform $VI_E$ distribution, reduced aromatic and organic polar compound content, low color intensity and UV stability.

9. The process of claim 8 wherein said lubricating oil product has color intensity ranging from about 0 to 2.5 (ASTM), substantially uniform $VI_E$ distribution between about 70 and 140, UV stability characterized by $t_s$ values ranging from about 5 to 45 days, and from 0 to 10 wt. percent of aromatic and organic polar compounds based on total product.

10. The process of claim 9 wherein step (a) is conducted at a temperature ranging between about 371° and 427° C., at a hydrogen partial pressure ranging between about 1000 and 2500 p.s.i.g. and at a hydrocarbon feed space velocity ranging between about 0.3 and 1.5 v./v./hr.

11. The process of claim 8 wherein the conversion in step (a) is less than about 30 wt. percent based on total feed to step (a).

12. The process of claim 8 wherein the conversion in step (b) is less than about 30 wt. percent, based on total feed to step (b).

13. The process of claim 10 wherein step (b) is conducted at a temperature between about 260° and 316° C., at a hydrogen partial pressure ranging between about 1000 and 2500 p.s.i.g. and at a hydrocarbon feed space velocity ranging between about 0.3 and 1.5 v./v./hr.

14. The process of claim 8 wherein said petroleum oil feedstock is a deasphalted hydrocarbon oil having an initial boiling point of at least about 500° C. at atmospheric pressure and a Conradson Carbon Residue number of less than about 3 or a hydrocarbon gas oil, a predominant portion of which boils between about 340° to 565° C. at atmospheric pressure.

15. A process for the preparation of lubricating oils having UV stability characterized by large $t_s$ values, substantially uniform $VI_E$ distribution, low color intensity and low aromatic and organic polar compound content comprising the steps, in combination of:

(a) contacting a waxy hydrocarbon feedstock, a major portion of which boils above about 340° C. at atmospheric pressure and containing aromatic and organic polar compounds, with hydrogen, at a temperature ranging between 371° and 427° C., at a hydrogen partial pressure ranging between 1000 and 2500 p.s.i.g. and at a hydrocarbon feed space velocity ranging between about 0.3 and 1.5 v./v./hr., in the presence of a catalyst selected from the group consisting of (1) a catalyst mixture comprising a major amount of an amorphous base component and a minor amount of a hydrogenation component and (2) a catalyst mixture comprising a major amount of an amorphous base component and minor amounts of a crystalline aluminosilicate component comprising less than about 5 weight percent of the total catalyst, and a hydrogenation component;

(b) contacting at least a portion of effluent from step (a) with hydrogen at a temperature ranging between about 260° and 316° C., at a hydrogen partial pressure ranging between about 1000 and 2500 p.s.i.g. and at a hydrocarbon feed space velocity ranging between about 0.3 and 1.5 v./v./hr., in the presence of a catalyst comprising a mixture of (1) an amorphous base component, (2) a crystalline aluminosilicate component comprising 10–30 weight percent of the total catalyst and having a $SiO_2:Al_2O_3$ mole ratio of at least 2.5 and an alkali metal content of less than about 2.0 weight percent( as alkali oxide), based on the total aluminosilicate component, and (3) a hydrogenation component;

(c) recovering a waxy lubricating oil product having UV stability as characterized by $t_s$ values ranging from about 5 to 45 days, substantially uniform $VI_E$ distribution between about 70 and 140, low color intensity ranging from about 0 to 2.5 (ASTM) and diminished aromatic and polar compound content ranging from about 0 to 10 weight percent based on total product; and (d) dewaxing at least a portion of said product and recovering a dewaxed lube oil.

16. The process of claim 15 wherein the catalyst of step (b) comprises a mixture of about 20 weight percent, based on total catalyst, of a nickel-exchanged faujasite having an alkali metal content of about 0.3 to 0.5 weight percent (as alkali-oxide), based on the total faujasite, alumina hydrogenation components selected from the group consisting of the oxides and sulfides of nickel, tungsten and molybdenum and mixtures thereof.

17. The process of claim 15 wherein jet fuel products boiling between about 177° and 268° C., at atmospheric pressure, are produced in addition to the lubricating oils.

18. The process of claim 1 wherein the conversion of feed hydrocarbons in step (b) to lower molecular weight hydrocarbons remains below about 30 wt. percent based on second stage feed.

References Cited

UNITED STATES PATENTS

| | | | |
|---|---|---|---|
| 3,654,130 | 4/1972 | Voorhies et al. | 208—57 |
| 3,494,854 | 2/1970 | Gallagher et al. | 208—59 |
| 3,649,519 | 3/1972 | Watkins | 208—59 |
| 3,654,133 | 4/1972 | Olson | 208—59 |
| 3,304,254 | 2/1967 | Eastwood et al. | 208—111 |
| 3,642,612 | 2/1972 | Girotti et al. | 208—89 |

OTHER REFERENCES

Application Auslegeschrift 105,832, July 1971, Germany, Gallagher et al., 208—59.

DELBERT E. GANTZ, Primary Examiner

G. E. SCHMITKONS, Assistant Examiner

U.S. Cl. X.R.

208—18, DIG. 2; 252—455 Z